Patented Mar. 6, 1934 1,949,884

UNITED STATES PATENT OFFICE 1,949,884

METHOD OF COLORING VITREOUS ARTICLES

Games Slayter, Columbus, Ohio, assignor to Owens-Illinois Glass Company, a corporation of Ohio No Drawing. Application July 14, 1932, Serial No. 622,569

6 Claims. (Cl. 49—81)

The present invention relates to a novel method of coloring the surface of articles made of glass or other vitreous material.

An object of the invention is to provide a practical method of coloring the surfaces or any predetermined surface portions of glass or vitreous articles in a manner and with coloring materials which will provide surfaces, the colors of which will have great permanency and durability.

In my copending application Serial Number 622,560, filed July 14, 1932, I have disclosed a method and apparatus for applying color to the surfaces of glass articles. According to the method set forth in said application, the coloring material is fused into and incorporated with the surface layer of the article itself in a manner to protect the color and, moreover, permit the use of highly refractory and stable coloring elements. In accordance with the method set forth in said application, the coloring material, in a finely divided state, is mixed with the flame of a burner and the flame applied to the surface which is to be colored. The flame is sufficiently intense to melt the surface portion of the article and cause the coloring material to be fused into or incorporated with said surface portion. In practicing said method the article is preferably raised to an annealing temperature before the flame and coloring material are applied.

The method forming the subject-matter of the present application involves features of novelty set forth and claimed in said copending application, particularly in the use of a blast burner for heating and melting a surface layer of the article to be colored, also the use of coloring materials of permanent character such as set forth in said copending application, and, moreover, in the use of colored glass which has been pulverized and which is fused with the surface of the article to be colored.

In accordance with the present invention, colored glass made in any conventional or preferred manner is employed as the coloring material. Such glass is ordinarily made by mixing with the raw batch, metals, metal oxides or salts which give the desired color to the glass produced by melting such batch. This colored glass is pulverized and made into a paste which is then applied to the surface of the article to be colored. The entire surface of the article may be covered with the color paste, or any desired portion, and in accordance with any predetermined pattern or design. This colored paste is usually applied cold or while both the article and the paste are at room temperature. The article is then introduced into an annealing leer and brought to an annealing temperature, thus rendering it sufficiently soft and plastic to withstand the localized heat to which it is to be subjected.

A blast burner, such as disclosed in said copending application, is now brought into operation and applies to the colored paste a flame of sufficient intensity to melt or fuse said paste and also a thin surface layer of the article itself, so that the coloring material is integrally united by fusion with the surface portion of the glass article. The intensity of the burner flame is such that this fusing operation can be completed before the heat from the burner has penetrated below the immediate surface of the article. After the coloring material has been thus fused to the article, the latter is annealed and cooled, thereby completing the process.

This process may be used for coloring glassware such as bottles, jars, glass building blocks and articles generally which are made of glass or other vitreous material. An ordinary annealing leer may be employed in which an endless conveyor carries the articles slowly through the leer. The burner may be located at an intermediate point at which the articles have reached, during their travel through the leer, a sufficiently high temperature to prevent cracking or breaking when the burner blast is applied thereto. After the color melting operation, the articles complete their journey through the leer, during which they are annealed.

The present invention is not limited to the use of the particular apparatus referred to for practicing the method set forth. Such method may evidently be practiced with a wide variety of apparatus. Modifications of the method may also be resorted to within the spirit and scope of my invention.

I claim:

1. The method of surface coloring an article of vitreous material, which comprises applying a layer of coloring material to the surface which is to be colored while said surface is cold and hard, then heating said surface to approximately an annealing temperature, and then applying to the surface to be colored, localized heat of sufficient intensity to fuse said coloring material and integrally unite it by fusion to said surface.

2. The method of coloring a vitreous surface, which comprises applying to said surface, while cold, a layer of vitreous material of the desired color, and afterward applying to said material an intense localized flame by which the material is fused and integrally united with said surface.

3. The method which comprises applying to the surface of a glass article while cold, a layer of glass, raising the temperature of said article and said layer to approximately an annealing temperature, and causing a fusion of said layer to the glass article by the application to said layer of a flame of sufficient intensity to fuse said layer and the surface to which it is applied before the heat can penetrate to any extent beneath the surface of said article.

4. The method which comprises applying powdered glass to the surface of a glass article while cold, heating said article to an annealing temperature, then fusing said material to said surface by the application of localized heat, and annealing and cooling the article.

5. The method which comprises applying powdered glass in the form of a paste to the surface of a glass article, while the latter is cold, heating said article to an annealing temperature, then fusing the powdered glass to said surface by the application of a sufficiently intense localized heat to fuse the powdered glass and a surface layer of said article, whereby said surface layer and the powdered glass are integrally united, and then annealing and cooling the article.

6. The method which comprises applying to the surface of a glass article, a layer of high temperature color material while said surface is cold, heating said article to an annealing temperature of about 1100 degrees F., fusing said color material into said surface by the application of an intense localized flame while the article is at said annealing temperature, and then annealing the article.

GAMES SLAYTER.